United States Patent [19]

Black et al.

[11] Patent Number: 4,552,682
[45] Date of Patent: Nov. 12, 1985

[54] PEROXIDE COMPOSITION CONTAINING PHENOLIC ANTIOXIDANT

[75] Inventors: Donald J. Black, Akron; Robert H. Tang, Norton, both of Ohio

[73] Assignee: PPG Industries, Inc., Pittsburgh, Pa.

[21] Appl. No.: 430,058

[22] Filed: Sep. 30, 1982

[51] Int. Cl.$^4$ .................... C01B 13/00; C01B 15/00; C09K 3/00
[52] U.S. Cl. .................................................. 252/186.26
[58] Field of Search .................... 252/186.42, 186.26

[56] References Cited

U.S. PATENT DOCUMENTS

| | | | |
|---|---|---|---|
| 2,202,877 | 6/1940 | Stevens et al. | 44/9 |
| 2,415,971 | 2/1947 | Stevens | 260/610 |
| 2,679,459 | 5/1954 | Rosenwald | 99/163 |
| 2,908,718 | 10/1959 | Rosenwald | 260/613 |
| 2,984,648 | 5/1961 | Williams et al. | 526/210 |
| 3,502,484 | 3/1970 | Kolasinski | 99/143 |
| 3,592,951 | 7/1971 | Zaweski | 260/624 |
| 3,825,509 | 7/1974 | Miller | 260/86.3 |
| 3,974,086 | 8/1976 | Rauhut et al. | 252/188.3 |
| 3,988,261 | 10/1976 | Barter et al. | 252/431 C |
| 4,039,475 | 8/1977 | Oosterwijk et al. | 252/431 R |
| 4,064,064 | 12/1977 | Rauhut et al. | 252/188.3 |
| 4,245,073 | 1/1981 | Noël | 526/230.5 |
| 4,299,940 | 11/1981 | Wei | 526/278 |
| 4,376,839 | 3/1983 | Malin | 526/212 |

FOREIGN PATENT DOCUMENTS

| | | | |
|---|---|---|---|
| 32757 | 7/1981 | European Pat. Off. | |
| 0064259 | 11/1982 | European Pat. Off. | 526/210 |
| 1345988 | 2/1974 | United Kingdom | |

*Primary Examiner*—Joseph L. Schofer
*Assistant Examiner*—Peter F. Kulkosky
*Attorney, Agent, or Firm*—Irwin M. Stein

[57] ABSTRACT

Phenolic antioxidant compounds are added to aqueous dispersions of organic peroxide to reduce the rate of self induced homolytic decomposition of the peroxide at temperatures of from above $-5°$ C. to $+20°$ C. From about 0.1 to about 2 mole percent, basis the organic peroxide, of phenolic antioxidant is preferentially used. Among the organic peroxides described are the dialkylperoxydicarbonates. Among the phenolic antioxidants described are hindered phenols such as 2,6-di-tertiarybutyl-4-methylphenol.

17 Claims, No Drawings

PEROXIDE COMPOSITION CONTAINING PHENOLIC ANTIOXIDANT

DESCRIPTION OF THE INVENTION

The present invention relates to organic peroxide dispersions in an aqueous medium which are stabilized against peroxide decomposition at storage temperatures of from about −5° C. to about 20° C. and the use of such liquid organic peroxide compositions for the polymerization of ethylenically unsaturated monomers.

The polymerization of ethylenically unsaturated materials susceptible to free-radical polymerization, e.g., unsaturated vinyl-type monomers, such as vinyl chloride, with organic peroxides is well-documented in the literature. The polymeric products produced from such polymerizations have found extensive commercial applications. Much of the polymerization of vinyl halides, such as vinyl chloride, vinyl bromide or vinyl fluoride (or the copolymerization of such vinyl halides with vinylidene halides such as vinylidene chloride, vinylidene fluoride or other terminal vinyl-unsaturated containing compounds) is conducted in an aqueous medium, i.e., as an emulsion or suspension of polymerization. In such polymerizations, the monomer or mixture monomers to be polymerized is dispersed in water in the presence of a surfactant and thereafter the polymerization initiated with an organic peroxide.

Addition of the organic peroxide to the aqueous polymerization medium has been accomplished by various techniques. For example, a predetermined amount of peroxide, either as neat (undiluted) peroxide or diluted with a solvent, such as mineral spirits, is charged to the polymerization vessel prior to or subsequent to the addition of the polymerizable monomer. Recently, it has been proposed to charge the organic peroxide to the polymerization reactor as an aqueous emulsion or suspension.

U.S. Pat. No. 3,825,509 describes a process for the suspension polymerization of vinyl chloride wherein the organic peroxide initiator is charged to the polymerization vessel as an aqueous emulsion in which the peroxide is present in an amount up to 19 weight percent. The surfactant used to prepare the aqueous peroxide emulsion is a combination of polyvinyl alcohol and polyoxyethylene sorbitan monolaurate. Emulsions containing greater than about 19 percent by weight of organic peroxide are described as being too viscous and therefore difficult to handle.

U.S. Pat. No. 4,039,475 describes aqueous suspensions of organic peroxides which are solid at about 20° C. The aqueous suspension contains a combination of nonionic emulsifiers, or nonionic and anionic emulsifiers, which permits the preparation of an aqueous suspension of solid organic peroxides in which the peroxide is present in amounts of from about 20 to about 50 weight percent. In order to prevent segregation of the solid peroxide from the suspending aqueous medium, thickeners are added to the suspension. Use of such aqueous suspensions for the aqueous suspension polymerization of a vinyl halide is described in U.S. Pat. No. 4,092,470.

U.S. Pat. No. 3,988,261 describes the preparation of frozen aqueous organic peroxide emulsions which exhibit stability to freeze-thaw cycling. The emulsion can comprise from about 30–75 weight percent of the organic peroxide and, when frozen, provides a safe, physical form for storing, handling and shipping the organic peroxide.

European patent application No. 32,757 relates to aqueous emulsions of organic peroxides which are liquid at −5° C. More particularly, the aforesaid European patent application describes incorporating between 2 and 20 weight percent of an alkanol having from 1 to 4 carbon atoms and/or an alkane diol having from 2 to 4 carbon atoms in said emulsion so as to maintain the peroxide emulsion in liquid form at temperatures of from −10° C. to −25° C.

A disadvantage of the use of aqueous peroxide emulsions, particularly peroxides which have a 10 hour half-life temperature (in benzene) of less than about 55° C., is their insufficient shelf life when maintained at temperatures significantly above −5° C., e.g., above 0° C. When the aqueous matrix is frozen, the shelf life of liquid peroxydicarbonates is relatively good, but active oxygen is still lost slowly, e.g., a forty weight percent emulsion of di-secondarybutyl peroxydicarbonate (SBP) stored at −4° C. loses only about 4.25% of its original active oxygen after ten weeks storage. At 0° C., a forty weight percent SBP emulsion loses about 20 percent of its original active oxygen after ten weeks storage; whereas a forty weight percent SBP solution loses about 4 percent of its original active oxygen after ten weeks storage at 0° C. Table I of U.S. Pat. No. 3,988,261 reports that a forty weight percent emulsion of SBP loses about 50 percent of its active oxygen after about 15 days when stored at 10° C. In contrast, a 40 weight percent solution in mineral spirits of SBP loses less than seven percent of its active oxygen after 14 days storage at that temperature.

It has now been discovered that the shelf life of liquid dispersions of aqueous peroxides can be improved at −5° C. to +20° C. by incorporating within the emulsion a stabilizing amount of a phenolic antioxidant. In particular, between about 0.01 and about 5 mole percent of a phenolic antioxidant, basis the organic peroxide, is incorporated into the aqueous dispersion. Stabilizing amounts of phenolic antioxidant reduce the rate of self induced homolytic decomposition of the peroxide. Phenolic compounds contemplated for use as antioxidants in aqueous peroxide dispersions are polyhydroxybenzenes, alkyl substituted hydroquinones, alkyl substituted phenols, bisphenols and diphenols.

DETAILED DESCRIPTION OF THE INVENTION

Phenolic compounds contemplated herein as additives to the aqueous organic peroxide dispersions described herein are phenolic antioxidants. Such compounds have been added to materials such as synthetic rubbers, plastics, gasoline, lubricants and food. Many of the aforesaid phenolic antioxidants are commercially available or can be readily prepared by alkylating hydroquinones, phenols, or cresols using well-known alkylation techniques. Among the phenolic compounds which can be incorporated into the aqueous peroxide dispersions of the present invention are polyhydroxybenzenes, alkylated hydroquinones, alkylated phenols (sometimes referred to as hindered phenols), bisphenols and diphenols. Other polyhydroxy antioxidants which can be utilized include 1,5-naphthalene diol.

Polyhydroxybenzenes contemplated for use herein as phenolic antioxidants are those compounds represented by the following graphic formula:

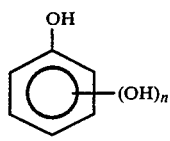

(I)

wherein n is the number 1 or 2. When n is 1, it is preferred that the hydroxyl group is bonded to the phenol nucleus at the ortho or para positions. When n is 2, it is preferred that the hydroxyl groups are bonded to the phenol nucleus at the ortho and para positions, although polyhydroxybenzenes in which the hydroxyl group is bonded to the phenol nucleus at the ortho and meta, and meta and para positions are also contemplated. Specific examples of polyhydroxybenzenes include: catechol, pyrogallol, 1,2,4-benzenetriol, and 1,3,5-benzenetriol.

Alkyl substituted hydroquinones contemplated for use as phenolic antioxidants include compounds represented by the graphic formula:

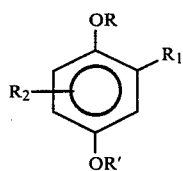

II wherein R is hydrogen or a hydroxy substituted alkyl group containing from one to four carbon atoms, R' is hydrogen, $C_1-C_4$ alkyl, phenyl, benzyl, and hydroxy substituted alkyl containing from one to four carbon atoms, and $R_1$ and $R_2$ are each hydrogen or $C_1-C_6$ alkyl. $R_2$ is bonded to the hydroquinone nucleus at the 5 or 6 position. Preferred alkyl substituted hydroquinones are those compounds in which R is hydrogen, R' is hydrogen, $C_1-C_2$ alkyl or benzyl and $R_1$ and $R_2$ are tertiarybutyl or tertiaryamyl.

Examples of alkyl substituted hydroquinones represented by the aforesaid graphic formula II include: hydroquinone, monotertiarybutyl hydroquinone, 2,5-ditertiarybutyl hydroquinone, 2,5-ditertiaryamyl hydroquinone, hydroquinone monomethylether, hydroquinone di-(betahydroxyethyl)ether, 2,6-dimethyl-4-methoxyphenol, 2-methyl-6-tertiarybutyl-4-methoxyphenol, 2-methyl-6-secondarybutyl-4-methoxyphenol, 2-methyl-6-tertiarybutyl-4-ethoxyphenol, 2-methyl-6-tertiaryamyl-4-methoxyphenol and other 2,6-dialkyl-4-alkoxyphenols, as described in U.S. Pat. No. 2,679,459, column 2, line 36 to column 3, line 27, which compounds are incorporated herein by reference. Also included are the 2,6-ditertiaryalkyl-4-alkoxyphenol compounds described in U.S. Pat. No. 2,908,718 at column 1, line 54 to column 2, line 15, which are incorporated herein by reference. Examples of such compounds include: 2,6-di-tertiarybutyl-4-methoxyphenol, 2,6-di-tertiaryamyl-4-methoxyphenol, 2,6-di-tertiarybutyl-4-ethoxyphenol and 2,6-di-tertiaryhexyl-4-methoxyphenol.

Alkyl substituted phenols (hindered phenols) contemplated for use as phenolic antioxidants include those represented by the following graphic formula III, and more particularly those represented by the graphic formula IIIA:

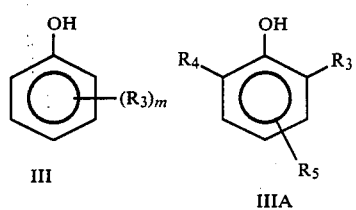

wherein $R_3$ is a tertiary $C_4-C_{12}$ alkyl group, preferably a tertiary $C_4-C_5$ alkyl group and m is the number 1, 2 or 3. When m is 1, the tertiary alkyl group bonded to the phenol nucleus can be in the ortho, meta or para position; but, is preferably in the ortho or para position. When m is 2, it is preferred that the alkyl substituents be at the two and six positions of the phenol nucleus; however, the alkyl groups can be substituted at the three and six, or the two and four positions. When m is 3, it is preferred that the alkyl groups are substituted at the two, four and six positions of the phenol nucleus; however, the alkyl groups can be substituted at the three, four and six positions. More particularly, when m is 3, the alkyl substituted phenyls are represented by the graphic formula IIIA wherein $R_3$ and $R_4$ are each tertiary $C_4-C_{12}$ alkyl groups, preferably tertiary $C_4-C_5$ alkyl groups, and $R_5$ is a normal, secondary, or tertiary $C_1-C_{12}$ alkyl or halo, e.g., chloro, substituted $C_1-C_{12}$, alkyl group. $R_5$ is preferably bonded to the phenol nucleus at the three or four positions, more preferably the four position. More preferably $R_3$ and $R_4$ are identical tertiary alkyl groups and $R_5$ is a $C_1-C_5$ alkyl or tertiary $C_4-C_5$ alkyl group.

Examples of alkyl substituted phenols include ortho-tertiarybutyl phenol, meta-tetiarybutyl phenol, para-tertiarybutyl phenol, paratertiaryamyl phenol, 2,6-ditertiarybutyl phenol, 3-methyl-6-tertiarybutyl phenol, 4-methyl-2-tertiarybutyl phenol, 2-methyl-6-tertiarybutyl phenol, 2,6-dimethyl phenol, 2,4-dimethyl phenol, 2-tertiarybutyl-6-isopropyl phenol, 3-methyl-4,6-ditertiarybutyl phenol, 4-methyl-2,6-ditertiarybutyl phenol, 2,4-dimethyl-6-tertiarybutyl phenol, 2,4,6-tri-tertiarybutyl phenol, 2,6-di-tertiarybutyl-4-n-butyl phenol, 2,6-di-tertiarybutyl-4-nonyl phenol, 2,6-di-tertiarybutyl-4-dodecyl phenol, 2,6-di-tertiarybutyl-4-isooctyl phenol, 2,6-di-tertiarybutyl-4-(1,1,4-trimethylpentyl)phenol, and 2,6-di-tertiarybutyl-4-isopropyl phenol. Other substituted phenols contemplated not represented by graphic formula III or IIIA include: ortho- and para-phenyl phenol and para-cumyl phenol.

Bisphenols contemplated as phenolic antioxidants include those phenolic compounds represented by the following graphic formulae IV and IVA.

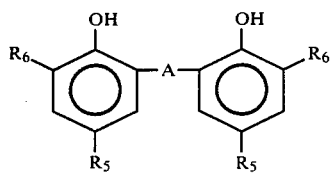

IV

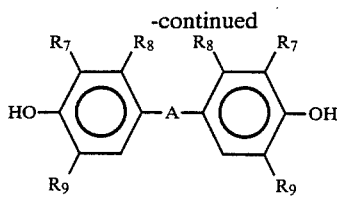

wherein A is a divalent alkyl radical, e.g., an alkylidene radical, having from one to four carbon atoms, e.g., methylene, ethylidene, alpha, alpha' dimethylmethylene, etc. $R_5$ is the same as identified with respect to graphic formula IIIA, $R_6$ is hydrogen, $C_1$–$C_{12}$ alkyl, preferably $C_1$–$C_5$, alkyl, more preferably tertiary $C_4$–$C_5$ alkyl, cyclohexyl and methylcyclohexyl, $R_7$ is hydrogen, $C_1$–$C_{12}$ alkyl, preferably $C_1$–$C_5$ alkyl, more preferably tertiary $C_4$–$C_5$ alkyl, $R_8$ is hydrogen or methyl, provided that when $R_7$ is hydrogen, $R_8$ is methyl, and $R_9$ is hydrogen or tertiary $C_4$–$C_{12}$ alkyl group, preferably a tertiary $C_4$–$C_5$ alkyl group.

Examples of phenolic compounds represented by graphical formulae IV and IVA include 4,4'-isopropylidene diphenol, 4,4'-methylene bis(2,6-di-tertiarybutylphenol), 4,4'-butylidene-bis(2,6-ditertiarybutylphenol), 4,4'-butylidene-bis(6-tertiarybutyl-3 methylphenol), 4,4'-ethylidene-bis(2-methylphenol), 2,2'-methylene-bis(4-methyl-6-tertiarybutylphenol)2,2'-methylene-bis(4-ethyl-6-tertiarybutylphenol), 2,2'-methylene-bis(2-methyl-6-tertiarybutylphenol), 2,2'-ethylidene-bis(4-methyl-6-tertiarybutylphenol), 2,2'-methylene-bis(4-chlorophenol), 2,2'-methylene-bis[6-(2-methylcyclohexyl)-4-methylphenol], 2,2'-methylene-bis[4-methyl-6-(1-methylcyclohexyl)phenol]), 2,2'ethylidene-bis(4,6-di-tertiarybutylphenol), and 4,4'-methylene-bis(6-tertiarybutyl-2-methylphenol).

Diphenols contemplated as phenolic antioxidants are those represented by the following graphic formula:

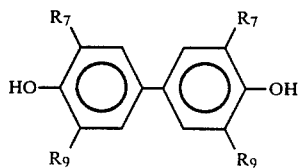

wherein $R_7$ and $R_9$ are the same as described with respect to the bisphenols of graphic formula IVA. Examples of diphenols include 4,4'-diphenol, and 4,4'-bis(2,6-ditertiarybutyl)diphenol.

One or mixtures of the aforedescribed phenolic compounds can be added to the aqueous organic peroxide dispersion as an antioxidant additive in stabilizing amounts, i.e., an amount of phenolic compound(s) that is sufficient to prevent substantial loss of organic peroxide during storage. It is contemplated that a stabilized aqueous organic peroxide dispersion is one which loses less than about 10 percent of the initial organic peroxide concentration over a period of 30 days when stored at 0° to 5° C. More particularly, between about 0.01 and about 5 mole percent, more typically between about 0.1 and about 2 mole percent, of the phenolic antioxidant, basis the organic peroxide in the aqueous dispersion, is used. The exact amount of phenolic antioxidant required to stabilize the peroxide dispersion against homolytic decomposition will vary and depend not only on the phenolic antioxidant used but also on the organic peroxide present in the dispersion. Determination of the suitability of a particular phenolic compound for a selected peroxide dispersion and the amount required to stabilize the peroxide can be effected by preparation of the stabilized peroxide dispersion and comparing its shelf life against the aforesaid standard.

The phenolic antioxidant is preferably in a liquid phase at the temperature of use and is at least partially soluble in the organic peroxide. The phenolic antioxidant can be added to the organic peroxide dispersion by any suitable method, e.g., it can be added directly to the liquid aqueous peroxide dispersion or the phenolic compound can be dissolved in a suitable solvent, e.g., an aliphatic alcohol such as $C_1$–$C_8$ alkanols, and the resulting solution added to the peroxide dispersion. Other solvents which can be used include benzene, toluene, odorless mineral spirits, or any other solvent (hydrocarbon or otherwise) which is used to form solutions of the peroxide dispersed in the aqueous dispersion.

As indicated, it is most preferred to use a phenolic antioxidant that is a liquid or in the liquid phase (dissolved in a suitable solvent) at the temperature of use with a peroxide which is also liquid or in the liquid phase at such temperature. This allows the peroxide and phenolic antioxidant to be in the same phase. When the antioxidant is a liquid and the peroxide is a solid, the peroxide should be at least partially soluble in the phenolic antioxidant. When the antioxidant is a solid and peroxide a liquid, the antioxidant should be at least partially soluble in the peroxide. When both the antioxidant and peroxide are solids, a mutual solvent for both (or separate readily miscible solvents for each) should be used to provide both in the same liquid phase.

The present invention is applicable to aqueous dispersions of organic peroxides that are useful as initiators for the free radical polymerization of ethylenically unsaturated materials and particularly to the polymerization of such materials in an aqueous medium, e.g., a suspension, solution or emulsion polymerization. Preferably, the organic peroxide is a liquid at 0° C. and more preferably is a liquid at −5° C. Still more preferably, the organic peroxide is liquid at from −10° C. to −20° C. When the peroxide is a liquid at the temperatures the dispersion is formed and stored, the resulting peroxide dispersion is more commonly referred to as an emulsion. When the peroxide is a solid at the aforesaid temperatures, the resulting peroxide dispersion is more commonly referred to as a suspension. For convenience, the term dispersion is used to refer to both an emulsion and a suspension.

Examples of organic peroxides contemplated for use in the present invention are organic peroxydicarbonate esters, organic peroxymonocarbonate esters, diacyl peroxides and organic peroxyesters. The organic peroxydicarbonate esters can be represented by the following graphic formula:

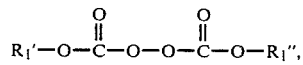

wherein $R_1'$ and $R_1''$ are each alkyl radicals of from 1 to 20 carbon atoms, e.g., 2 to 12 carbon atoms, or an aromatic (aryl) radical of from 6 to 8 carbon atoms. In particular, $R_1'$ and $R_1''$ are alkyl radicals having from 2 to 8 e.g., 3 to 4, carbon atoms. More particularly, $R_1'$ and $R_1''$ can be the same or different, aliphatic or cycloaliphatic, branched or straight chain, and substituted and unsubstituted. Examples of $R_1'$ and $R_1''$ are methyl, ethyl, n-propyl, isopropyl, n-butyl, isobutyl, secondarybutyl, tertiarybutyl, capryl, 2-ethylhexyl, benzyl, cyclohexyl, 4-tertiarybutylcyclohexyl, 3-methoxyphenol, 2-ethoxyethyl, myristyl, cetyl, stearyl, and 4-tertiaryamylcyclohexyl. Preferably, the peroxydicarbonate ester is di-n-propyl peroxydicarbonate, diisopropyl peroxydicarbonate, di-secondarybutyl peroxydicarbonate and di-2-ethylhexyl peroxydicarbonate. Mixtures of peroxydicarbonates can also be used to prepare the organic peroxide dispersion.

Peroxydicarbonate esters are well-known in the art and many are commercially available. Peroxydicarbonate esters are prepared typically by reacting the corresponding alkyl chloroformate with aqueous sodium peroxide at low temperatures, e.g., 0° C.-10° C., as described, for example, in the Journal of American Chemical Society, Volume 72, page 1254 (1950) and in U.S. Pat. No. 2,370,588.

Examples of organic peroxymonocarbonate esters contemplated are those represented by the following graphic formula:

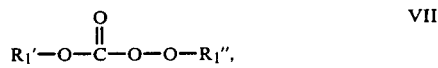

wherein $R_1'$ and $R_1''$ are as defined above. Preferably $R_1''$ in formula VII is a tertiary alkyl, e.g., $C_4$-$C_6$ tertiary alkyl radical and $R_1'$ is a lower alkyl, e.g., $C_1$-$C_6$ alkyl, radical. Of particular interest is tertiarybutyl or tertiaryamylperoxy isopropylmonocarbonate. The above peroxymonocarbonate esters are known in the art and can be prepared by reacting the corresponding alkyl chloroformate, i.e.,

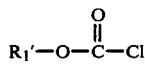

(isopropyl chloroformate), with the corresponding alkyl hydroperoxide, i.e., $R_1''$—O—O—H (e.g., tertiarybutyl hydroperoxide), in the presence of an acid acceptor. See page 1259 and 1261 of the aforesaid J.A.C.S. article.

Examples of diacyl peroxides contemplated are those represented by the following graphic formula:

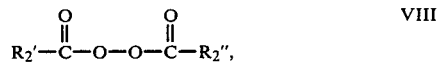

wherein $R_2'$ and $R_2''$ are each alkyl radicals of from 1 to 20, particularly 1-12, and more particularly 2-4, carbon atoms, or an aromatic or halo-substituted aromatic radical of from 6 to 8 carbon atoms. Thus $R_2'$ and $R_2''$ can each be methyl, ethyl, n-propyl, isopropyl, n-butyl, secondarybutyl, heptyl, nonyl, phenyl, halosubstituted phenyl, e.g., chlorophenyl and 2,4-dichlorophenyl, undecyl, octyl, etc. Of particular interest is diisobutyryl peroxide. Examples of other diacyl peroxides include: acetyl peroxide, benzoyl peroxide, caprylyl peroxide, p-chlorobenzoyl peroxide, decanoyl peroxide, 2,4-dichlorobenzoyl peroxide, lauroyl peroxide, pelargonyl peroxide, propionyl peroxide, didecanoyl peroxide, and dimyristoyl peroxide. Diacyl peroxides are prepared commonly by treating the appropriate acid chloride or anhydride with sodium peroxide or with hydrogen peroxide in the presence of a base, e.g., pyridine. See for example, Organic Peroxides, Volume I, page 65, D. Swern, Ed., John Wiley & Sons, New York, 1970.

Examples of peroxyesters contemplated are the alkyl and -cumyl esters of peroxycarboxylic acids, the acid portion of which contains from 3 to 13 carbon atoms. The alkyl ester portion of the peroxyester usually contains 4 to 5 carbon atoms, e.g., the tertiarybutyl or tertiaryamyl radical. The aforesaid peroxyesters can be represented by the following graphic formula:

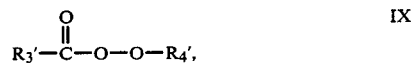

wherein $R_3'$ is an alkyl radical of from 2 to 12, e.g., 5 to 10, carbon atoms and $R_4'$ is an alkyl radical of 4 or 5 carbon atoms, most typically, the tertiarybutyl or tertiaryamyl radical, or the alpha cumyl radical. Examples of such peroxyesters include tertiarybutylperoxy pivalate, tertiaryamylperoxy pivalate, tertiarybutylperoctoate, tertiarybutyl perneodecanoate, tertiarybutylperoxy acetate, tertiarybutylperoxy isobutyrate, tertiarybutylperoxy-2-ethylhexanoate, tertiarybutylperoxy-3,5,5-trimethylhexanoate, tertiarybutyl peroxybenzoate, tertiaryamyl peroxyneodecanoate, and alpha-cumyl perneodecanoate. The aforesaid peroxyesters are typically prepared by treating the corresponding alkylhydroperoxide with an acylating agent.

In accordance with the present invention, a dispersion (emulsion or suspension) of the organic peroxide is prepared by dispersing the peroxide in water with a suitable dispersing aid, e.g., a surfactant or emulsifying agent. It is contemplated that the dispersion can contain between about 10 and 65 weight percent, typically between about 15 and 60, and more typically between 20 and 60, e.g., 40, weight percent, of the peroxide. The phenolic antioxidant can be added to the peroxide dispersion in stabilizing amounts, or the phenolic antioxidant can be charged to the water containing the surfactant or to the organic peroxide before the dispersion is formed.

As manufactured and stored, it is likely that the peroxide dispersion will contain a high percentage of organic peroxide, e.g., 20 or 40 to 60 or 65 weight percent. When used as an initiator for the emulsion or suspension polymerization of, for example, vinyl chloride, the peroxide composition of the present invention can be added to the polymerization vessel in its concentrated form or it can be diluted, e.g., with water, for more precise monitoring of the amount of peroxide added to the polymerization reactor.

The preparation of aqueous organic peroxide dispersions is well-documented in the literature. See, for example, U.S. Pat. No. 3,988,261. Generally, the surfactant(s) is dissolved in the aqueous medium and the organic peroxide added to the water phase with agitation. The order of addition of the two phases, i.e., whether the external phase is added to the internal phase or vice versa, is generally of no concerns since a dispersion can be prepared by the well-known inversion technique. However, the unstable characteristics and hazards associated with large quantities of organic peroxides suggests that it is best for the peroxide to be the discontinuous phase. Consequently, it is recommended that the organic peroxide be added slowly to the water phase to form the aqueous dispersion.

The temperature at which the peroxide composition of the present invention is formed is not critical, but should be low enough to avoid loss of peroxide by homolytic decomposition. The specific temperature used will depend on the organic peroxide and difficulties associated with handling that peroxide at a given temperature. For highly reactive organic peroxides, it is recommended that the temperature of the aqueous medium during formation of the dispersion be in the range of between above about 0° C. and 20° C., preferably from about +5° C. to 10° C. In the event that the surfactant(s) require higher temperatures for dissolution in the aqueous medium, the surfactant-water solution should be cooled before the peroxide is added to it. In preparing the peroxide composition, deionized or distilled water will typically be used.

Equipment used to prepare the peroxide dispersion is similarly well known. Any of the well-known equipment which is capable of breaking up or dispersing the internal phase, e.g., organic peroxide, in the external phase, e.g., water medium, so that the particle size of the resulting dispersion is sufficiently small to retard coalescence and resulting breakdown of the dispersed phase can be used. The choice of emulsification equipment is governed chiefly by the apparent viscosity of the dispersion in all stages of manufacture, the amount of mechanical energy input required and heat exchange demands, all of which are well known to persons skilled in the art. Examples of agitators capable of providing the proper degree of agitation are mechanically rotated paddle and anchor-type agitators; propeller agitation, i.e., one or more propellers mounted on a common shaft; turbine agitation, i.e., the use of fixed baffles, either on the mixing tank wall or adjacent to the propellers. Colloid mills and homogenizers are also suitable. Heat removal from the dispersion as it is being formed should be used to maintain the temperature of the total liquid medium below a temperature at which the organic peroxide undergoes significant homolytic decomposition.

The viscosity of the compositions of the present invention can vary but should be sufficiently free flowing to be handled by normal pumping means, i.e., the composition should be pumpable so that it can be handled in standard liquid handling equipment. The viscosity will vary depending on the amount of organic peroxide (and consequently the amount of water) that is used. The viscosity can be increased by known techniques, such as by adding thickeners to the continuous phase, by increasing the amount of the internal phase or by reducing the particle size of the emulsion. Preferably, the viscosity will be less than 500 poises, more preferably not more than 100 poises.

The amount of dispersing aid or emulsifier (hereinafter surfactant) used in the preparation of the peroxide dispersions of the present invention can vary; however, an amount of surfactant is used which is sufficient to provide a well dispersed, stable (non-settling with time) peroxide dispersion, i.e., an emulsifying amount. As a consequence, the peroxide remains dispersed at its designated storage temperature over such storage periods as are normally encountered in conventional commercial usage. Typically, the surfactant represents between about 1 and about 10 weight percent, more usually between about 3 and about 7 weight percent, e.g., about 5 weight percent, of the total dispersion. The exact amount of surfactant required can be ascertained easily by simple trial and error techniques using the aforementioned ranges as a guideline. Since surfactants are relatively expensive materials, only that amount which is required to accomplish the desired result are commonly used.

The surfactant should be soluble in the water phase to the extent required to perform the intended function and should remain dissolved in the water phase at all temperatures at which the dispersion is stored or handled. The surfactant should have a low chemical reactivity, i.e., it should be chemically inert or compatible with the organic peroxide and the phenolic antioxidant, and preferably should be compatible chemically with the polymerization environment to which the organic peroxide dispersion is added.

The surfactant can be anionic, cationic, nonionic or amphoteric. More commonly, the surfactant will be anionic or nonionic, more typically nonionic. Combinations of two or more surfactants or colloids are commonly used. See, for example, U.S. Pat. No. 4,092,470. Cationic and anionic surfactants are not used together since one would offset the surfactant properties of the other. Selection of a particularly useful surfactant for a particular organic peroxide can be facilitated by referring to the polymerization in which the organic peroxide emulsion will be used. In the aqueous polymerization, i.e., emulsion or suspension polymerization, of ethylenically unsaturated materials, emulsifiers and surfactants are used to maintain the polymer product dispersed within the aqueous polymerization medium. Anionic surfactants are commonly used with emulsion polymerizations while nonionic surfactants find extensive use in suspension polymerizations.

The subject of emulsions is covered in detail in Volume 8, pages 117–154 in the Kirk-Othmer Encyclopedia of Chemical Technology, second edition, John Wylie and Sons, Inc. 1965. A typical list of emulsifiers are presented on pages 128–130 of the aforementioned article. That article is hereby incorporated in toto by reference. The subject of surfactants is also covered in Volume 19 of the aforementioned Encyclopedia of Chemical Technology on pages 507–593, which article is also herein incorporated by reference. A brief discussion of the anionic, cationic and nonionic surfactants described in the aforementioned article follows.

Anionic Surfactants

Carboxylates—The carboxylate class of surfactants are represented principally by the soaps and aminocarboxylates. Soaps have the general composition, $(R_{10}COO)^-(M)^+$ wherein $R_{10}$ is an alkyl group, usually in the $C_9$–$C_{21}$ range and M is a metallic ion, e.g., alkali metal or alkaline earth metal such as sodium, potassium, magnesium, calcium, barium and iron, or hydrogen or an amine ion. The amine salts, i.e., wherein M is an amino group are excellent emulsifiers. Examples of $R_{10}COO^-$ groups include lauroyl, oleoyl, stearoyl, cocoyl, and tall oil acyl.

Sulfonates—The sulfonate class of surfactants can be represented by the general formula, $R_{11}SO_3M$, wherein $R_{11}$ is a hydrocarbon group in the surfactant molecular weight range and M is typically an alkali metal, e.g., sodium, ammonium or amine group. Generally, the sulfonates are alkylbenzenesulfonates, petroleum sulfonates, sulfosuccinates, naphthalenesulfonates, N-acyl-N-alkyltaurates, $\beta$-sulfoesters of fatty acids, or -$\alpha$ olefin sulfonates.

The alkylbenzenesulfonates, i.e., $R_{12}C_6H_4SO_3M$, are widely used. $R_{12}$ is typically $C_4$–$C_{14}$ alkyl, e.g., dodecyl, tridecyl, or nonyl, and M is sodium, calcium, hydrogen, ammonium or triethanolamino. Dialkyl sulfosuccinates are generally available as the sodium salt. The alkyl portion of the ester are in the $C_4$–$C_{14}$ range, mainly the $C_4$–$C_8$ range.

Naphthalenesulfonates, $R_{13}C_{10}H_6SO_3M$, are generally the salts of alkylnaphthalenesulfonates, salts of sulfonated formaldehyde-naphthalene condensates, salts of naphthalenesulfonates, and salts of tetrahydronaphthalenesulfonates, $R_{13}$ is typically $C_3$–$C_9$ alkyl. M is usually sodium or hydrogen.

Sulfates and Sulfated Products—The sulfate surfactants are grouped generally into sulfated alcohols, sulfated natural fats and oils, sulfated acids, amides and esters, ethoxylated and sulfated alkylphenols and ethoxylated and sulfated alcohols. Alkyl sulfates, $R_{14}OSO_3M$, are useful as emulsifiers and dispersants in emulsion polymerization. $R_{14}$ is typically $C_8$–$C_{18}$ alkyl, e.g., lauryl, 2-ethylhexyl, cetyl, oleyl, and octyl; while M is alkali, alkaline earth metal, e.g., sodium, potassium or magnesium, ammonium, triethanolamino, or diethanolamino.

Sulfated natural fats and oils are generally derivatives of tallow, castor oil, sperm oil, coconut oil, cod oil, neats'-foot oil, peanut oil and soybean oil. Sulfated polyoxyethylene alkylphenols, $R_{15}C_6H_4(OCH_2CH_2)_nOSO_3M$, are efficient emulsifiers and dispersants. $R_{15}$ is usually $C_9$ (nonyl), or $C_{12}$ (dodecyl), n is 2 to 5 and M is as defined hereinbefore, e.g., sodium, ammonium or triethanolamino. Sulfated polyoxyethylene alcohols, $R_{16}(OCH_2CH_2)_nOSO_3M$ are also useful in emulsion polymerization. $R_{16}$ is usually $C_{12}$–$C_{14}$, e.g., lauryl, tridecyl, or myristyl, n is 1 to 4 and M is as defined hereinbefore, i.e., usually sodium, ammonium or triethanolamino.

Phosphate Esters—Alkylphosphate and alkyl polyphosphate surfactants are also used as polymerization emulsifiers. The alkyl portion typically varies from $C_8$–$C_{18}$. Di(2-ethylhexyl)phosphate is typical of the orthophosphate esters, and a typical polyphosphate is (2-ethylhexyl)$_5$Na$_5$(P$_3$O$_{10}$)$_2$.

Nonionic Surfactants

Nonionic surfactants can be classed into the following groups: ethoxylated alkylphenols, ethoxylated aliphatic alcohols, carboxylic esters, carboxylic amides and polyoxyalkylene oxide block copolymers.

Ethoxylated alkylphenols—These nonionic surfactants are prepared from $C_6$–$C_{12}$ alkyl substituted phenols. The number of moles of ethylene oxide per mole of hydrophobe (alkyl phenol) can vary between 1.5 and about 30. The weight percent of combined ethylene oxide is usually from 40–95 percent to achieve good water solubility, more typically 60–95 percent. Nonylphenoxypoly (ethyleneoxy) ethanol is an example of this type of material.

Ethoxylated Aliphatic Alcohols—These nonionic surfactants are generally prepared from $C_{12}$–$C_{18}$ alcohols or mixtures of alcohols of that chain length and the mole ratio of combined ethylene oxide to hydrophobe varies from about 1 to 50, more often from 4 to 20. Examples of alcohols that can be ethoxylated are lauryl, oleyl, cetyl, stearyl, tridecyl, myristyl, trimethylnonyl, $C_{12}$–$C_{15}$ primary linear and $C_{11}$–$C_{15}$ secondary alcohol.

Carboxylic Esters—Examples of these type of surfactants are the glycerol esters, polyethylene glycol esters, anhydrosorbitol esters, ethoxylated anhydrosorbitol esters, ethylene and diethylene glycol esters, propanediol esters and ethoxylated natural fats and oils. The glycerol esters are either mono- or diglycerides of fatty acids, usually $C_{12}$–$C_{18}$ fatty acids. The polyethylene glycol-esters are also esters of fatty, rosin, and tall oil acids. The fatty acids also generally contain 12 to 18 carbon atoms.

The mono-, di- or triesters of sorbitan and fatty acids are the most typical commercially available fatty acid esters of anhydrosorbitol. Sorbitan is a mixture of anhydrosorbitols of which 1,4-sorbitan and isoorbide are the principal components. The fatty acids are typically the $C_{12}$–$C_{18}$ fatty acids. Ethoxylation of the sorbitan fatty acid esters leads to a series of more hydrophilic surfactants. The number of oxyethylene units per mole of ester varies usually between 4 and 20.

The ethylene glycol, diethylene glycol and 1,2-propanediol esters of fatty acids having 12 to 18 carbon atoms are also used as surfactants. Ethoxylated castor oil and lanolin derivatives are the significant volume products of the ethoxylated natural fats and oils.

Polyvinyl Alcohol—Polyvinyl alcohol (PVA) is a hydrophilic colloid resin prepared by the acid or alkaline hydrolysis of a vinyl polymer, usually poly(vinyl acetate). The molecular weight of the PVA depends on the molecular weight of the parent polymer. The degree of hydrolysis of the parent polymer will vary the properties of the PVA. For use as a water soluble surfactant, hydrolysis should be substantial, e.g., 65 percent or more of the acetate groups should be hydrolyzed. The weight average molecular weight of the parent poly(vinyl acetate) is reported to vary between 11,000 and 1,500,000.

Water-Soluble Cellulose Ethers—Water-soluble cellulose ethers can also be used as surfactants in the present process. The cellulose ethers of commercial importance can be classified into three types. They are: (1) ionic-carboxymethylcellulose, e.g., sodium carboxymethylcellulose, (2) hydroxyalkylcellulose, e.g., hydroxyethylcellulose and (3) nonionicalkylcellulose, e.g., methylcellulose.

Sodium carboxymethylcellulose is a hydrophilic colloid that is anionic in character and is useful for stabilizing emulsions. A derivative, sodium carboxymethylhydroxyethylcellulose, is less sensitive to precipitation by salt solutions and acid, and is also useful in preparing the emulsions of the present process. Hydroxyethylcellulose is the principal commercial hydroxyalkylcellulose; however, hydroxypropylcellulose can also be used. Examples of alkyl cellulose include methylcellulose and ethylcellulose. Other water-soluble ethers include methylhydroxypropylcellulose, ethylhydroxyethylcellulose and methylethylcellulose. The degree of substitution (the average number of hydroxyl groups of the three available in the anhydroglucose unit that have been substituted) of the aforementioned cellulose ethers is usually at least about 0.5 and preferably at least 0.8 in order to attain water solubility.

Other hydrophilic-organic colloids that can be used in the present process in addition to the surfactants include the vegetable and other gums, e.g., starch, gelatin, pectin, and sodium alginate, and, inorganic suspending agents, such as the clays, bentonites and other finely-divided solids. For ease of reference, all of the aforementioned ingredients used to emulsify the peroxide (other than water) will be referred to as surfactants.

Cationic Surfactants

The hydrophilic moieties in cationic surfactants are usually the quaternary nitrogens. The quaternary ammonium salts can be categorized into dialkyldimethylammonium salts, alkylbenzyldimethylammonium salts (chlorides), alkyltrimethylammonium salts and alkylpyridinium halides. The quaternary salts are usually halides, e.g., chlorides or bromides, sulfates or sulfonates.

The organic peroxide dispersion can contain other materials which are added to prevent segregation of solid organic peroxide, e.g., thickeners, and materials capable of lowering the freezing point of the dispersion to permit the dispersion to remain liquid and easily pumpable at temperatures below 0° C.

As thickeners, there can be used the water-soluble cellulose ethers such as carboxymethylcellulose, heretofore described, polyvinylalcohol, polyvinylpyrrolidone, polyacrylic acid, carboxyvinylpolymers, gelatin, starch, agar, etc. Depending on the type of thickener, the desired viscosity of the dispersion, the nonionic emulsifier used and the solid peroxide, the amount of thickener incorporated into the dispersion can be in the range of from about 0.05 to about 10 percent by weight. More typically, the amount of thickener incorporated is in the range of from 0.2 to 4 percent by weight.

To reduce the freezing point of the dispersion, there can be added from about 2 to about 20 percent by weight of an alkanol having from 1 to 4 carbon atoms and/or an alkane diol having from 2 to 4 carbon atoms. See for example European patent application No. 32,757.

In preparing the organic peroxide dispersions of the present invention, it is convenient to dissolve the surfactant(s) and/or the protective colloid in water, and add the phenolic antioxidant and organic peroxide to the resulting surfactant solution. The order in which these substances are combined is not critical.

The water used to form the dispersion is usually deionized or demineralized and deionized water to prevent the introduction of contaminants into the system in which the emulsion is used. The amount of water used to prepare the dispersion will vary with the amount of peroxide, surfactant (and/or protective colloid), phenolic antioxidant and other additives present in the dispersion. The remainder of the dispersion after accounting for all of the aforementioned specific ingredients will be water. Typically the amount of water in the dispersion will vary between about 35 and about 90 weight percent.

The peroxide compositions of the present invention can be stored at the recommended storage temperatures for the peroxide or at higher temperatures due to the presence of the antioxidants. Those peroxides which are relatively stable at ambient temperatures will require no additional temperature control. However, those peroxides which normally require refrigeration for storage, shipment, etc. can have those requirements moderated. Generally, the less stable peroxides, e.g., the percarbonates, are stored at about −20° C. In accordance with the present invention, such materials can be stored at from −20° C. to about +20° C., more typically from −5° C. to +20° C., e.g., −5° C. to +5° C. or +10° C.

The peroxide composition of the present invention can be charged directly to the polymerization vessel or, if desired, diluted, e.g., with water, before being introduced into such vessel. Since the compositions are liquid and non-segregating, i.e., they remain dispersed during storage, they can be pumped from storage to the point of end use. The peroxide composition is used in amounts predetermined to be sufficient to initiate and sustain the polymerization reaction. Typically, enough of the peroxide composition is charged to the polymerization vessel to provide therein from about 0.01 to about 3 weight percent of the peroxide, basis the ethylenically unsaturated monomer The stabilized organic peroxide dispersions described herein can be used to initiate the emulsion, solution or suspension homopolymerization or copolymerization of ethylenically unsaturated monomers. Examples of such monomers include the vinyl halides and vinylidene halides, such as vinyl chloride, vinyl bromide, vinyl fluoride, vinylidene chloride and vinylidene fluoride. Other monomers include those having at least one terminal $CH_2=C$ vinyl grouping, such as esters of acrylic acid, e.g., methyl acrylate, ethyl acrylate, butyl acrylate, octyl acrylate, cyanoethyl acrylate, allyl acrylate and the like; esters of methacrylic acid, e.g., methyl methacrylate, butyl methacrylate, and the like; styrene and styrene derivatives, e.g., -methyl styrene, vinyl toluene, chlorostyrene, and the like; vinyl acetate, vinyl propionate, vinyl stearate, vinyl benzoate, acrylonitrile, methacrylonitrile, ethyl vinyl benzene, vinyl naphthalene, vinyl ethers, acrylamide, dialkyl fumarates and maleates, olefins, e.g., ethylene and propylene; diolefins, e.g., butadiene, isoprene, chloroprene, and the like; and other vinyl monomers of the types known to those skilled in the art.

The present process is more particularly described in the following Examples which are intended as illustrative only since numerous modifications and variations therein will be apparent to those skilled in the art.

EXAMPLE 1

An aqueous emulsion of di-2-ethylhexyl peroxydicarbonate (EHP) was prepared by dissolving 1.14 grams of sorbitan monopalmitate and 0.86 grams of polyoxyethylene sorbitan monopalmitate surfactants in 36 grams of distilled water, and adding 62 grams of EHP to the aqueous surfactant solution with agitation. The EHP assayed 96.7 weight percent di-2-ethylhexyl peroxydicarbonate. The resulting EHP emulsion was placed in a stoppered glass flask and stored in a refrigerated container maintained at 0° C. to +5° C. At various intervals over a period of 128 days, samples of the emulsion were removed from the flask and analyzed for EHP. Results are tabulated in Table I.

EXAMPLE 2

The procedure of Example 1 was repeated except that (a) the EHP used to prepare the emulsion contained 0.062 grams (0.14 mole %) of 2,6-di-tertiarybutyl-4-n-butylphenol, which was obtained by dissolving 0.1 grams of the aforesaid phenolic compound in 99.9 grams of EHP (96.7% assay), and (b) 35.9 grams of water were used to prepare the emulsion.

EXAMPLE 3

The procedure of Example 1 was repeated except that (a) the EHP used to prepare the emulsion contained 0.6 grams of the phenolic compound of Example 2, which was obtained by dissolving 1.0 grams (1.50 mole %) of the phenolic compound in 99.0 grams of EHP (96.3% assay), and (b) 35.4 grams of water were used to prepare the emulsion.

EXAMPLE 4

The procedure of Example 1 was repeated except that (a) the EHP used to prepare the emulsion contained about 0.06 grams (0.09 mole %) of 2,6-di-tertiarybutyl- 4-methylphenol (BHT), which was obtained by dissolving 0.1 grams of BHT in 2 grams of 2-ethylhexanol and then dissolving the BHT-containing 2-ethylhexanol in 98 grams of EHP (96.3% assay), and (b) 34 grams of water were used to prepare the emulsion.

EXAMPLE 5

The procedure of Example 1 was repeated except that the EHP used to prepare the emulsion contained about 0.6 grams (1.85 mole %) of BHT, which was obtained by dissolving 1.0 grams of BHT in 2 grams of 2-ethylhexanol and then dissolving the BHT-containing 2-ethylhexanol in 98 grams of EHP (96.3% assay).

TABLE I

| Days Elapsed | EXAMPLE NO. | | | | |
|---|---|---|---|---|---|
| | 1 | 2 | 3 | 4 | 5 |
| | Wt. % EHP | | | | |
| 0 | 60.63 | 61.09 | 60.32 | 59.90 | 59.45 |
| 4 | 59.69 | 61.00 | 59.67 | 59.73 | 59.07 |
| 6 | 59.67 | 61.12 | 59.22 | 59.22 | 59.05 |
| 8 | 59.07 | 60.80 | 59.54 | 58.60 | 58.91 |
| 12 | 57.77 | 60.60 | 59.47 | 56.84 | 58.99 |
| 19 | 54.29 | 60.21 | 59.10 | 52.17 | 58.84 |
| 23 | 52.59 | 59.91 | 58.82 | 49.90 | 58.75 |
| 27 | 50.66 | 59.72 | 56.12 | 47.28 | 58.54 |
| 36 | 48.82 | 58.67 | 56.04 | 43.99 | 58.21 |
| 46 | 42.09 | 57.80 | 52.18 | 39.24 | 56.67 |
| 50 | 41.15 | 57.56 | 50.64 | 35.78 | 54.09 |
| 56 | 39.63 | 57.45 | 49.27 | 35.46 | 53.75 |
| 59 | 39.71 | 57.74 | 48.39 | 34.21 | 52.91 |
| 65 | 39.17 | 57.00 | —$^a$ | —$^a$ | 51.51 |
| 74 | 38.76 | 56.80 | — | — | 49.91 |
| 86 | 36.63 | 56.25 | 41.52 | 29.10 | 48.33 |
| 100 | 36.05 | 55.43 | 39.10 | 27.45 | 46.67 |
| 128 | 35.24 | 54.11 | 33.98 | 24.03 | 45.22 |

$^a$Data not obtained.

The data of Table I show that the use of stabilizing amounts of a phenolic antioxidant, as in Examples 2 and 5, helps to stabilize the organic peroxide against self induced homolytic decomposition at the storage temperature of 0° C. to 5° C.

Although the present invention has been described with reference to specific details of certain embodiments thereof, it is not intended that such details be regarded as limitations upon the scope of the invention except as and to the extent that they are included in the accompanying claims.

I claim:

1. A peroxide composition consisting essentially of:
   a. from about 10 to about 65 weight percent organic peroxide dispersed in an aqueous medium containing sufficient surfactant to provide a stable dispersion, and
   b. an amount of phenolic antioxidant sufficient to reduce the rate of self induced homolytic decomposition of the organic peroxide at temperatures of from 0° C. to +5° C.

2. The peroxide composition of claim 1 wherein from 0.01 to about 5 mole percent of phenolic antioxidant, basis the organic peroxide, is used.

3. The peroxide composition of claim 1 wherein from 0.1 to about 2 mole percent of phenolic antioxidant, basis the organic peroxide, is used.

4. The peroxide composition of claim 2 wherein the phenolic antioxidant is selected from the group consisting of polyhydroxybenzenes, alkylated hydroquinones, alkylated phenols, bisphenols, and diphenols.

5. The peroxide composition of claim 1, 2 or 3 wherein the phenolic antioxidant is selected from the group consisting of:

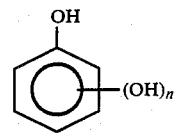

(a)

wherein n is the number 1 or 2;

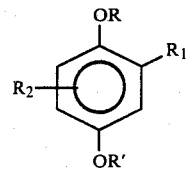

(b)

wherein R is hydrogen or hydroxy-substituted $C_1$–$C_4$ alkyl, R' is hydrogen, $C_1$–$C_4$ alkyl, phenyl, benzyl or hydroxy-substituted $C_1$–$C_4$ alkyl, and $R_1$ and $R_2$ are each hydrogen or $C_1$–$C_6$ alkyl;

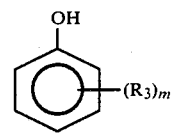

(c)

wherein $R_3$ is a $C_4$–$C_{12}$ tertiary alkyl and m is the number 1, 2 or 3;

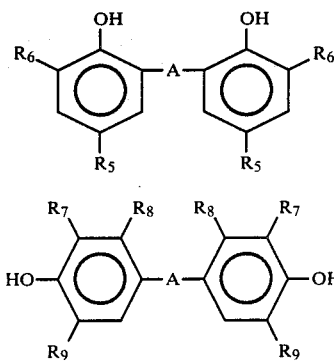

(d)

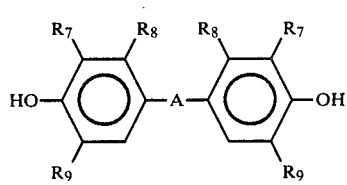

(e)

wherein A is a divalent alkyl radical having from 1 to 4 carbon atoms, $R_5$ is a $C_1$–$C_{12}$ alkyl or halo-substituted $C_1$–$C_{12}$ alkyl, $R_6$ is hydrogen, $C_1$–$C_{12}$ alkyl, cyclohexyl, or methylcyclohexyl, $R_7$ is hydrogen, $C_1$–$C_{12}$ alkyl, $R_8$ is hydrogen or methyl, and $R_9$ is hydrogen or tertiary $C_4$–$C_{12}$ alkyl, provided that when $R_7$ is hydrogen, $R_8$ is methyl; and

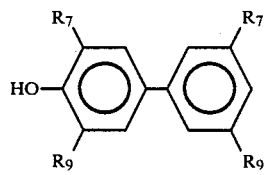

(f)

wherein $R_7$ and $R_9$ are as defined above.

6. The peroxide composition of claim 5 where in:

(i) graphic formula (b), R is hydrogen, R' is hydrogen, $C_1$–$C_2$ alkyl or benzyl and $R_1$ and $R_2$ are tertiarybutyl or tertiaryamyl, (ii) graphic formula (c), $R_3$ is a tertiary $C_4$–$C_5$ alkyl, (iii) graphic formula (d), (e) and (f) $R_5$ is a $C_1$–$C_5$ alkyl or $C_4$–$C_5$ tertiaryalkyl, $R_6$ is a $C_1$–$C_5$ alkyl, and $R_7$ and $R_9$ are a $C_4$–$C_5$ tertiaryalkyl.

7. The peroxide composition of claim 4 wherein the organic peroxide is an organic peroxydicarbonate ester, an organic peroxymonocarbonate ester, a diacyl peroxide, or an organic peroxyester.

8. The peroxide composition of claim 6 wherein the organic peroxide is a peroxydicarbonate ester having the graphic formula,

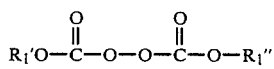

wherein $R_1'$ and $R_1''$ are each a $C_2$–$C_{12}$ alkyl or $C_6$–$C_8$ aryl radical.

9. The peroxide composition of claim 8 wherein the peroxydicarbonate is di-n-propyl peroxydicarbonate, di-isopropyl peroxydicarbonate, di-n-butyl peroxydicarbonate, di-secondarybutyl peroxydicarbonate and di-2-ethylhexylperoxydicarbonate.

10. A peroxide composition consisting essentially of:
  a. from about 10 to about 65 weight percent of an organic peroxide selected from the group consisting of organic peroxydicarbonate ester, organic peroxymonocarbonate ester, diacyl peroxide or organic peroxyester dispersed in an aqueous medium containing sufficient surfactant to provide a stable dispersion, and
  b. 0.01 to about 5 mole percent of phenolic antioxidant selected from the group consisting of:

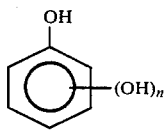

wherein n is the number 1 or 2;

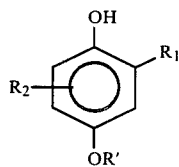

wherein R is hydrogen or hydroxy-substituted $C_1$–$C_4$ alkyl, R' is hydrogen, $C_1$–$C_4$ alkyl, phenyl, benzyl or hydroxy-substituted $C_1$–$C_4$ alkyl, and $R_1$ and $R_2$ are each hydrogen or $C_1$–$C_6$ alkyl;

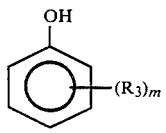

wherein $R_3$ is a $C_4$–$C_{12}$ tertiary alkyl and m is the number 1, 2 or 3;

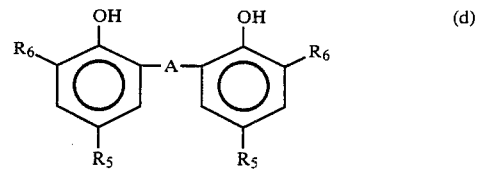

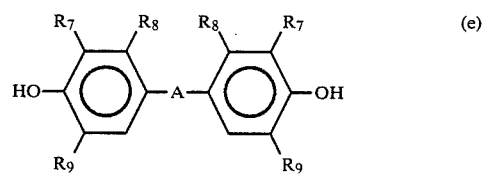

wherein A is a divalent alkyl radical having from 1 to 4 carbon atoms, $R_5$ is a $C_1$–$C_{12}$ alkyl or halo-substituted $C_1$–$C_{12}$ alkyl, $R_6$ is hydrogen, $C_1$–$C_{12}$ alkyl, cyclohexyl, or methylcyclohexyl, $R_7$ is hydrogen, $C_1$–$C_{12}$ alkyl, $R_8$ is hydrogen or methyl, and $R_9$ is hydrogen or tertiary $C_4$–$C_{12}$ alkyl, provided that when $R_7$ is hydrogen, $R_8$ is methyl; and

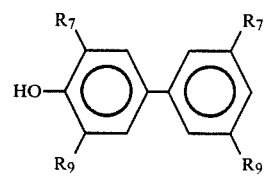

wherein $R_7$ and $R_9$ are as defined above.

11. The peroxide composition of claim 10 where in:
(i) graphic formula (b), R is hydrogen, R' is hydrogen, $C_1$–$C_2$ alkyl or benzyl and $R_1$ and $R_2$ are tertiarybutyl or tertiaryamyl,
(ii) graphic formula (c), $R_3$ is a tertiary $C_4$–$C_5$ alkyl,
(iii) graphic formula (d), (e) and (f) $R_5$ is a $C_1$–$C_5$ alkyl or $C_4$–$C_5$ tertiaryalkyl, $R_6$ is a $C_1$–$C_5$ alkyl, and $R_7$ and $R_9$ are a $C_4$–$C_5$ tertiaryalkyl.

12. The peroxide composition of claim 10 wherein the organic peroxide is a peroxydicarbonate ester having the graphic formula,

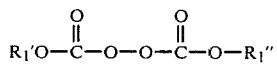

wherein $R_1'$ and $R_1''$ are each a $C_2$–$C_{12}$ alkyl or $C_6$–$C_8$ aryl radical.

13. The peroxide composition of claim 11 wherein the organic peroxide is a peroxydicarbonate ester selected from the group di-n-propyl peroxydicarbonate, di-isopropylperoxydicarbonate, di-n-butyl peroxydicarbonate, di-secondarybutyl peroxydicarbonate and di-2-ethylhexylperoxydicarbonate.

14. The peroxide composition of claim 12 wherein from 0.1 to about 2 mole percent of phenolic antioxidant, basis the organic peroxide, is used.

15. The peroxide composition of claim 13 wherein from 0.1 to about 2 mole percent of phenolic antioxidant, basis the organic peroxide, is used.

16. A peroxide composition consisting essentially of:
  a. from about 10 to about 65 weight percent organic peroxide dispersed in an aqueous medium containing sufficient surfactant to provide a stable dispersion, and b. from 0.1 to about 2 mole percent of phenolic antioxidant selected from the group consisting of 2,6-di-tertiarybutyl-4-n-butylphenol and 2,6-di-tertiarybutyl-4-methylphenol.

17. A peroxide composition consisting essentially of:
a. from about 10 to about 65 weight percent of an organic peroxydicarbonate ester selected from the group consisting of di-n-propyl peroxydicarbonate, di-isopropyl peroxydicarbonate, di-n-butyl peroxydicarbonate, di-secondary butyl peroxydicarbonate and di-2-ethylhexyl peroxydicarbonate dispersed in an aqueous medium containing sufficient surfactant to provide a stable dispersion, and
b. 0.01 to about 5 mole percent of phenolic anti-oxidant selected from the group consisting of 2,6-di-tertiarybutyl-4-n-butylphenol and 2,6-di-tertiarybutyl-4-methylphenol.

* * * * *